(12) United States Patent
Besnard et al.

(10) Patent No.: US 7,298,104 B2
(45) Date of Patent: Nov. 20, 2007

(54) SYSTEM FOR ELECTRICALLY REGULATING THE MOVEMENT TRANSMISSION DEVICE FOR A MOTOR VEHICLE

(75) Inventors: Sébastien Alain Joël Besnard, Bourg-la-Reine (FR); Jacques Augustin Laeuffer, Paris (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 171 days.

(21) Appl. No.: 10/536,969

(22) PCT Filed: Nov. 25, 2003

(86) PCT No.: PCT/FR03/03477

§ 371 (c)(1),
(2), (4) Date: Oct. 7, 2005

(87) PCT Pub. No.: WO2004/050414

PCT Pub. Date: Jun. 17, 2004

(65) Prior Publication Data

US 2006/0087268 A1 Apr. 27, 2006

(30) Foreign Application Priority Data

Nov. 29, 2002 (FR) .................................. 02 15006

(51) Int. Cl.
*H02P 7/00* (2006.01)
(52) U.S. Cl. ..................... 318/432; 318/431; 318/45; 318/439
(58) Field of Classification Search ........... None
See application file for complete search history.

(56) References Cited

U.S. PATENT DOCUMENTS

| 5,973,463 A | * | 10/1999 | Okuda et al. ............... 318/430 |
| 6,453,222 B1 | * | 9/2002 | Lasson et al. ................ 701/22 |
| 6,852,054 B2 | * | 2/2005 | Tumback et al. .............. 475/5 |

FOREIGN PATENT DOCUMENTS

| EP | 1 092 583 A1 | 4/2001 |
| EP | 1 199 204 A1 | 4/2002 |
| FR | 2 811 944 | 1/2002 |
| FR | 2 832 357 | 5/2003 |
| JP | 2002112407 A * | 4/2002 |
| WO | WO 02/47931 A1 | 6/2002 |

* cited by examiner

*Primary Examiner*—Lincoln Donovan
*Assistant Examiner*—Renata McCloud
(74) *Attorney, Agent, or Firm*—Nicolas E. Seckel

(57) ABSTRACT

The invention concerns a system for electrically regulating a power transmission device between the heat engine and a pair of electrical machines and the drive wheels of a motor vehicle, the heat engine being connected to the two electrical machines via a mechanical assembly, while an electrical connection device located between the two electrical machines provides a direct passage for power from one machine to the other, the connection transferring electric power between the two electrical machines being carried out via two static converters connected to a bus whereof the two lines are connected to a bus whereof the two lines are connected by a capacitor. The invention is connected by a capacitor. The invention is characterized in that the voltage at the capacitor terminals is permanently maintained at a specific setpoint value, the system acting on the torque of the two electrical machines, in response to an error signal resulting from the comparison of the effective value with said voltage to said setpoint value. The invention is applicable to motor vehicle transmission.

17 Claims, 2 Drawing Sheets

SYSTEM FOR ELECTRICALLY REGULATING THE MOVEMENT TRANSMISSION DEVICE FOR A MOTOR VEHICLE

The present invention relates to a regulation system for the drive transmission device of an automobile vehicle.

More precisely, the subject of the invention is an electrical regulation system designed for a power transmission device—or "drive train"—between, on one side, a thermal engine and/or electrical machines, and on the other, the drive wheels of an automobile vehicle, the vehicle in question comprising, in addition to the traditional thermal engine, a pair of electrical machines. A mechanical assembly connects the thermal engine and the two electrical machines, whereas a connecting device allows the passage of electrical power between the two electrical machines.

In a hybrid motorization of this type, when the thermal engine operates, a part of its power can be transmitted directly, and by mechanical means, to the drive wheels of the vehicle. Another part can be diverted by the electrical system formed by the two electrical machines. This technique of power diversion allows the power transmitted to the wheels to be modulated.

Such a system, that normally requires the presence of a high-voltage battery, also allows one of the electrical machines to be operated in "generator" mode, whereas the other operates in "motor" mode, such that, under certain driving conditions (notably in a braking phase), power that would normally have been lost is recovered by the battery equipping the vehicle, via the generator machine.

A control circuit for the various motors is, of course, controlled by a computer as a function, on the one hand, of predetermined setpoints (cartographic data), and on the other, of the effective driving conditions in real time, these conditions being known to it thanks to suitable sensors capable of measuring various pertinent parameters, such as for example the speed of the drive wheels, the speed and/or acceleration of the vehicle, the degree of depression of the accelerator and brake pedals, the speed and output torque of the thermal engine, in addition to the speed and output torque of each of the two electrical machines.

This statement is totally non-limiting.

The parameters implemented are chosen so as to optimize driving safety and comfort while at the same time achieving maximum reduction in fuel consumption.

In the French patent applications N° 00 09461 of Jul. 19$^{th}$ 2000 (FR-2 811 944) and N° 01 15050 of Nov. 21$^{st}$ 2001, the applicant proposed improvements to the transmission devices of the type mentioned above.

The device described in the application N° 00 09461 does not require the presence of a high-voltage battery. For this purpose, a connecting device situated between the two electrical machines provides a direct passage for power from one machine to the other, without a significant intermediate energy storage or recovery element; this connecting device is controlled such that the power generated by one of the two electrical machines is immediately consumed by the other, and in order that the two electrical machines respond to the needs of the drive train.

The connection allows the transfer of electrical energy between the two electrical machines by means of two static power converters in the form of two inverters, each one being associated with one electrical machine. These two inverters are connected to one another via their DC power supplies that are connected to a bus whose voltage between the two lines must be held at a constant value.

According to a preferred embodiment of this device, the thermal engine is connected to the two electrical machines by means of a mechanical assembly that consists of a planetary gearing arrangement.

In the device described in the application N° 01 15050, at least two planetary gearing arrangements are utilized that connect the thermal engine and the electrical machines together and to the wheels of the vehicle. A mechanical switching device, with no power dissipation element, allows the mode of operation of the transmission device to be modified by making the drive pass through one and or the other of the two gearing systems.

Such a device allows the power consumption to be reduced even further.

In a device of the type described in the application N° 00 09461, that does not comprise a high-power battery, in which the power generated by one of the electrical machines must be immediately consumed by the other, the intermediate energy storage capacity is very limited. Indeed, this storage is provided by an electrochemical capacitor which can only store the quantities of energy exchanged for an extremely short period of time, of the order of a few milliseconds.

Where there is an imbalance between the production and the consumption of these quantities of electrical energy, even of very low amplitude, there is therefore a risk of seeing the voltage across the terminals of the capacitor either collapsing to zero, or exceeding a given acceptable threshold.

In the first case, the exchange of power between the two machines is no longer ensured.

In the second case, the inverters are instantaneously destroyed by the effect of the over-voltage.

In order to overcome these problems, again according to the application N° 00 09461, the difference between the voltage measured across the terminals of the capacitor and a given reference voltage, for example equal to 400 volts, is continuously monitored.

Where there is a difference between the measured actual value and this reference value, an error signal is generated that acts on the torque control of one of the two electrical machines, in this case the machine referred to as 'driver' with reference 30 in said patent application, which signal is of course applied in the direction to correct the error.

As regards the torque of the other machine, referred to as 'variator' and with reference 20, this remains dependent on the mechanical objectives of the transmission, which depend on the requirements of the drive train.

In this patent application (page 11, line 31 to page 12, line 7), the possibility is mentioned of inverting this control loop, such that it is then the variator machine 20 that is controlled by the voltage error measurement, whereas the drive machine 30 is controlled as a function of the requirements of the drive train.

On the other hand, it is not intended here that, during operation, the torque control induced by the error signal can successively and selectively be applied to one or the other of the two machines 20-30.

Now, it can happen—and this is the case in particular for a device with two planetary gearing arrangements such as that in the application N° 15050—that neither of the two solutions envisioned in the application N° 00 09461 can be applied in every situation.

This can be explained from the equation governing the power balance on the high-voltage bus connecting the two inverters which can be written as follows:

$$P \in +Ca \cdot \omega a + Cb \cdot \omega b + C \cdot V \cdot dV/dt = 0$$

in which equation:

P∈ is the power corresponding to the losses by the electrical machines and by its use in the rest of the vehicle;

Ca and Cb are the values of the torques delivered respectively by each of the two electrical machines;

ωa and ωb are the regime values (rotation speeds) of each of the two electrical machines;

C is the capacitance value of the capacitor;

V is the voltage across the capacitor terminals;

dV/dt is the time derivative of this voltage.

Power equilibrium assumes that V is kept stable (and hence that dV/dt=0).

P∈ can not, of course, be acted upon.

The only variables that can be controlled are Ca and Cb.

In the case where ωa=0, which means that the first electrical machine is stopped, any action on this machine that would tend to modify the torque Ca would be ineffective, since Ca×0=0

Therefore, it is imperative that the error signal act on Ca.

On the other hand, in the case where ωb=0, which means that the second electrical machine is stopped, any action that would tend to modify the torque Cb of this machine would be ineffective Therefore, the error signal then has to act on Ca.

Given that ωa and ωb are never simultaneously zero, an action or actions can always in principle be carried out on either Ca or on Cb, or on both at the same time, such that the sum Ca·ωa+Cb·ωb remains continuously equal to a certain value Σ, which will be referred to as 'electrical setpoint value'.

On the other hand, the objectives of the transmission impose a mechanical setpoint M that is a given function of the torques Ca and Cb.

This yields a system of two equations with two unknowns, namely:

$$\Sigma = Ca \cdot \omega a + Cb \cdot \omega b$$

and $$M = \text{Function}(Ca, Cb),$$

hence the values of Ca and Cb can be continuously extracted by means of an ad hoc control circuit, called electrical regulation module, which receives the mechanical and electrical setpoints and which controls the torque of each of the two electrical machines via their respective associated inverters.

The aim of the invention is therefore to propose a regulation system of the type described above that ensures that the voltage across the terminals of the capacitor be continuously maintained at a given setpoint value, called 'voltage setpoint value', while at the same time being capable of acting on the torque of each of the two electrical machines, either separately or simultaneously, and in any case continuously, in response to the error signal resulting from the comparison of the measured value of this voltage with respect to the setpoint value.

The subject of the invention is therefore a system for the electrical regulation of a device for transmission of power between, on one side, the thermal engine and a pair of electrical machines equipping an automobile vehicle, and on the other, its drive wheels, the thermal engine being connected to the two electrical machines by means of a mechanical assembly, for example with two planetary gearing arrangements, whereas an electrical connecting device situated between the two electrical machines provides a direct passage for power from one machine to the other, with no significant intermediate energy storage or recovery element, this connecting device being controlled such that the power generated by one of the two electrical machines is immediately consumed by the other, and in order that the two electrical machines respond to the requirements of the drive train, the connection providing the transfer of electrical power between the two electrical machines and achieving this by means of two inverters, each one being associated with one electrical machine, these two inverters being connected to a bus whose two lines are connected via a capacitor.

This system is noteworthy in that, on the one hand, it is designed to ensure that the voltage across the terminals of the capacitor be continuously maintained at a given setpoint value, called 'voltage setpoint value', and on the other, that it is capable of acting on the torque of each of the two electrical machines, either separately or simultaneously, and in any case continuously, in response to the error signal resulting from the comparison of the measured value of this voltage with respect to said setpoint value.

Furthermore, according to a certain number of possible advantageous features of the invention:

a value Σ, called 'electrical setpoint value', is produced by a corrector device from the error in the voltage value of the capacitor with respect to the setpoint value;

the sum Ca·ωa+Cb·ωb remains continuously equal, or substantially equal, to said value referred to as 'electrical setpoint value' Σ, Ca and Cb being the values of the torques respectively delivered by each of the two electrical machines, whereas ωa and ωb are the regime values (rotation speeds) of each of these machines;

the system disposes of one free input corresponding to a value M, referred to as 'mechanical setpoint value', that is defined for the transmission;

the regulation is performed by resolving either a system of two equations with two unknowns Ca and Cb, Ca and Cb being the torque values respectively delivered by each of the two electrical machines, when these machines are not in torque limit, or a system comprising one equation and one inequality with two unknowns Ca and Cb in the other situations, so as to continuously ensure that the sum Ca·ωa+Cb·ωb remains continuously equal, or substantially equal, to the value Σ, and that the value of the controlled mechanical quantity is as close as possible to said mechanical setpoint value M;

the transfer of power between the two electrical machines is reversible.

Other features and advantages of the invention will become apparent from its description that will now be presented with reference to the appended drawings which illustrate one of its possible embodiments.

Figure 1:
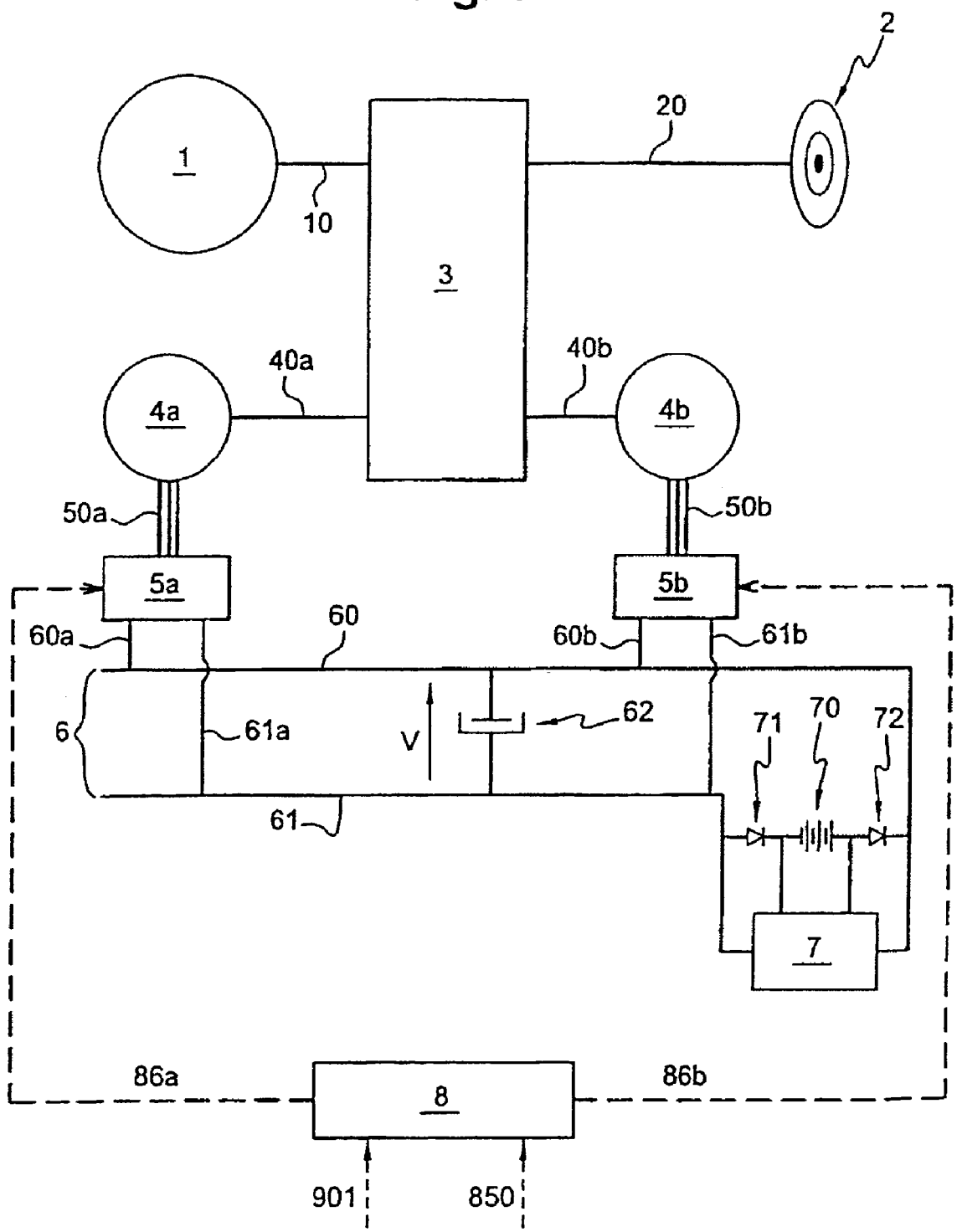
FIG. 1 shows a highly schematic representation of a transmission device for an automobile vehicle, for which the electrical regulation system according to the invention is designed.

Referring to FIG. 1, the vehicle comprises a thermal engine 1, drive wheels 2, and a pair of electrical machines 4a, 4b.

The thermal engine 1 and the two electrical machines 4a and 4b are connected together by means of a mechanical assembly 3.

The latter can notably be formed by two planetary gearing arrangements associated with a mechanical switching device, as described in the aforementioned application N° 01

15050, to which reference may be made as needed, in respect of both its structure and its operation.

The thermal engine 1 and the two electrical machines 4$a$ and 4$b$ are connected to the mechanical assembly 3 by means of their respective exit drive shafts 10, 40$a$ and 40$b$.

The exit drive shaft 20 of the mechanical assembly 3 controls the drive wheels 2.

Each electrical machine 4$a$, 4$b$ can just as easily be operated as either a current generator (when it is made to rotate by the associated drive shaft 40) or as a motor (when an electrical current is applied to it).

These electrical machines are synchronous AC machines, which have the advantage of being very compact and of exhibiting a high efficiency. Their rotation speed is substantially proportional to the frequency of the power supply current.

As an example, this frequency is around 10 kHz.

They are configured in parallel and are each powered by a DC/AC current converter in the form of inverters 5$a$ and 5$b$, respectively.

As was already stated above, the values of the torques respectively delivered by each of the two electrical machines 4$a$, 4$b$ will be denoted by Ca and Cb and the rotation speeds of each of these machines by $\omega a$ and $\omega b$, respectively.

The two inverters 5$a$ and 5$b$ are connected together via their DC power supply lines 60$a$-61$a$ and 60$b$-61$b$ to a bus 6 whose two lines carry the references 60 and 61.

As in the device of the application N° 00 09461, to which reference may be made as needed, this connecting device does not comprise any high-power battery.

Thus, the sum of the two DC electrical powers of the two inverters 5$a$ and 5$b$ must be zero or, in other words, any electrical power generated by one of the inverters and delivered to the bus 6 must be immediately consumed by the other inverter.

This equates to the fact that the voltage between the lines 60 and 61 of the bus must be maintained at a constant value V, for example equal to 400 volts. This value is a nominal working value that is suitable for an assembly formed by an inverter and an electrical machine designed for this application.

A capacitor 62 inserted between the two inverters 61$a$, 61$b$ and connected to the lines 60 and 61 allows a small storage of energy between the two inverters, which is necessary for their operation.

By way of example, the capacitor 62 has a capacitance of around 1000 µF (microFarads).

Various types of capacitor may be used, such as those, notably, of the electrochemical, dielectric film or ceramic type.

Preferably, as in the embodiment illustrated in FIG. 4 of the aforementioned prior application, the bus 6 is connected to a high-to-low voltage converter 7 associated with the service battery, of much lower voltage, for example 42 volts. The converter 7 provides the battery charging function.

This battery is protected from the high voltage by diodes 71-72.

It allows the thermal engine 1 to be started by driving one electrical machine, thus obviating the need for a starter.

A control device 8, that will be referred to as 'electrical regulation module', allows each of the inverters 5$a$, 5$b$, to be acted on via control links 86$a$, 86$b$, shown using dashed lines with arrows in FIG. 1.

These actions consist in imposing given values of torque and speed on the machine 4$a$, 4$b$ associated with each inverter, when it is operating in motor mode; these parameters depend, respectively, on the intensity and on the frequency of the AC current supplied to the machine by the inverter.

As will now be explained with reference to FIG. 2, the device 8 receives external instructions via input lines 850, 901, also shown using dashed lines with arrows in FIG. 1.

Figure 2:
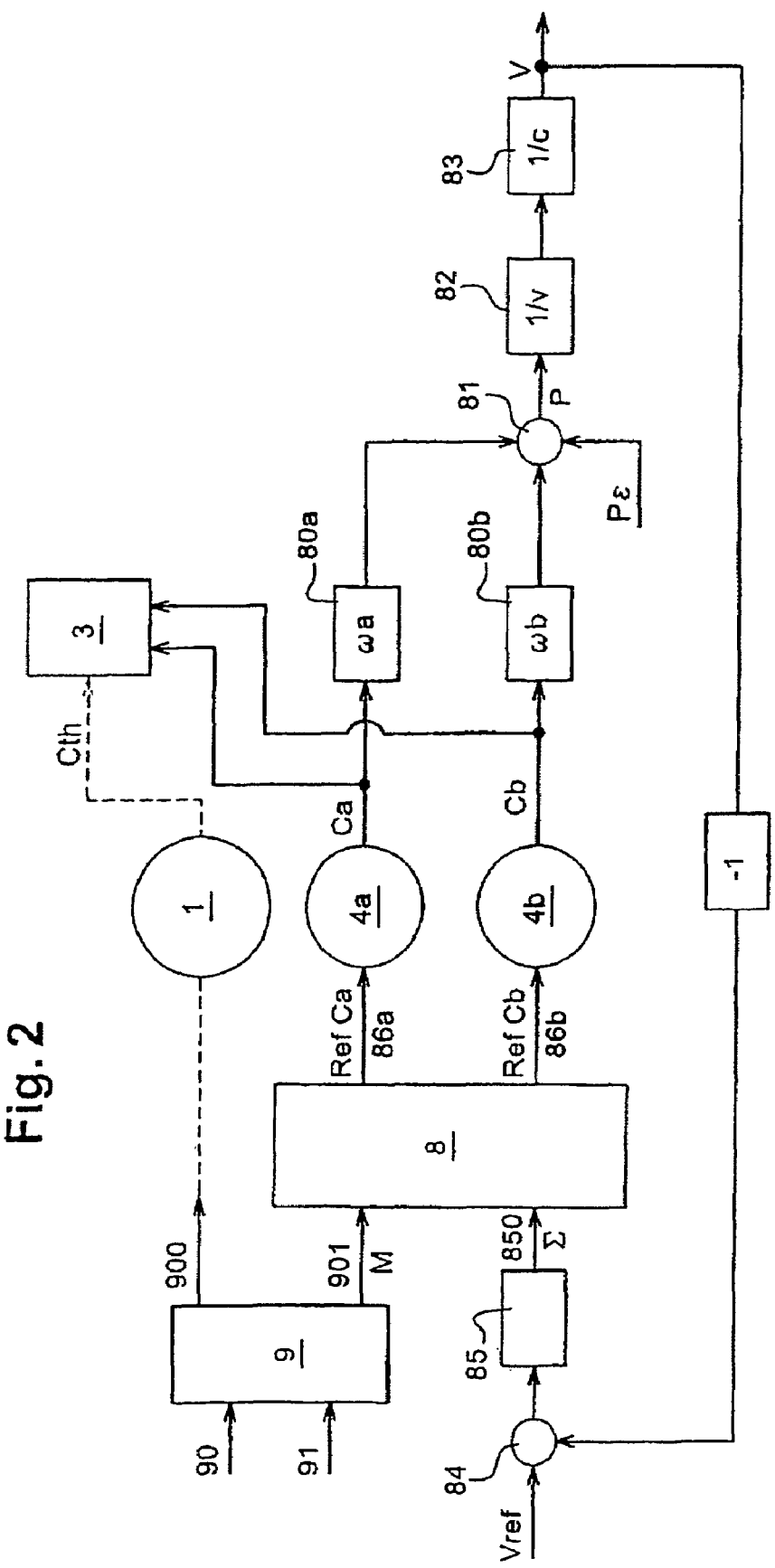
FIG. 2 shows a block diagram illustrating the layout and operation of the regulation system.

In FIG. 2, the rectangle 9 symbolizes the mechanical regulation device. This has inputs 90, 91 for instructions and/or parameters associated with the driving situation, for example the value of the torque effectively developed on the drive wheels and the regime demanded from the thermal engine (that can notably depend on the degree of depression of the accelerator pedal and on predetermined cartographic data governing the desired driving style).

It has two outputs, one of which 900—shown using dashed lines with arrows in the figure—controls the thermal engine 1.

Its other output 901 corresponds to one of the inputs of the electrical regulation module 8 mentioned below.

This input 901 delivers a setpoint M, called 'mechanical setpoint', to the device 8. The setpoint may apply to the torque Ca, to the torque Cb, or to a combination of these two torques. It depends on the requirements of the drive train and aims, as a function of these requirements, to transfer via the electrical link the power required to obtain the mechanical characteristics desired by the system.

This principle has been comprehensively described in each of the aforementioned prior patent applications to which reference could be made in this regard, if needed.

The other input 850 of the electrical regulation module 8 delivers a setpoint $\Sigma$, called 'electrical setpoint', to the latter corresponding to the value of the sum 'Ca·$\omega a$+Cb·$\omega b$'.

The module 8 imposes on each of the motors 4$a$, 4$b$ reference torques 'Ref Ca' and 'Ref Cb', respectively, via outputs 86$a$ and 86$b$ that are a function of the real-time input setpoints M and $\Sigma$ and of the regulation algorithm that it must apply, while at the same time, of course, driving the inverters associated with said machines.

The torques Ca and Cb are transmitted to the mechanical assembly 3, as is the torque Cth delivered by the thermal engine 1.

The modules 80$a$-80$b$ and 81 are representative of the electrical power balance at the capacitor.

The output of the adder operator 81 therefore corresponds to the value of the effective power P at the terminals of the capacitor: P=P∈+Ca·$\omega a$+Cb·$\omega b$.

The power P∈ is the power loss corresponding to the total of the losses that are dissipated in the electrical machines and consumption losses from its use in the rest of the vehicle (for lighting, car radio, etc.).

The effective voltage V measured across the terminals of the capacitor is represented at the output of module 83 by the successive divisions of the power P by the voltage V (operator 82) and by the capacitance C (operator 83).

This value is sent to a comparator 84 that compares it with the setpoint value, equal to the reference voltage Vref desired across the terminals of the capacitor.

In the case of an error, in other words of a difference between the values of V and of Vref, in either direction, a corrector device 85, for example of the 'proportional integral' type, capable of ensuring a high global stability of the control loop, modifies the setpoint $\Sigma$ so as to recover equality between the two values.

In such a system, the regulation is normally effected by resolving a system of two equations with two unknowns (Ca and Cb).

However, if one of these values reaches its maximum in absolute value (torque limit), the system comprises an equation and an inequality with two unknowns (Ca and Cb).

It is not then possible to satisfy both the electrical setpoint value $\Sigma$ and the mechanical value M simultaneously, but only one of the two.

In the case where M were to take priority, there would be a risk of a large variation in V, which would no longer be controlled, either in the direction of an over-voltage or of a voltage drop, which could lead to the destruction of the inverters in either case.

This is the reason why the adherence to the electrical setpoint value $\Sigma$ takes priority, which is acheived by acting on the machine not in torque limit.

The invention claimed is:

1. A system for the electrical regulation of a device for transmission of power between, on one side a thermal engine and a pair of electrical machines equipping an automobile vehicle, and on the other side, drive wheels of the automobile vehicle,
   - the thermal engine being connected to the two electrical machines by means of a mechanical assembly,
   - an electrical connecting device being located between the two electrical machines so as to provide a direct passage for power from any one of the two electrical machines to the other of the two electrical machines, without a significant intermediate energy storage or recovery element,
   - the connecting device being controlled so that the power generated by any one of the two electrical machines is immediately consumed by the other of the two electrical machines, and so that the two electrical machines respond to requirements of a drive train,
   - the connecting device comprising a bus connected to the two electrical machines by means of two inverters, each of said inverters being associated with one of the two electrical machines, so as to provide a transfer of electrical power between the two electrical machines
   - the bus having two lines connected via a capacitor,
   - wherein said system comprises an electrical regulation module regulating a voltage (V) across terminals of the capacitor so that said voltage is continuously maintained at or around a given voltage setpoint value (Vref),
   - wherein said electrical regulation module acts on torques of both of the two electrical machines, either separately or simultaneously, and in any case continuously, in response to an error signal resulting from a comparison of a measured value of the voltage (V) with respect to the voltage setpoint value (Vref).

2. The system for electrical regulation of a power transmission device as claimed in claim 1, wherein an electrical setpoint value ($\Sigma$) is produced by a corrector device from the error in the voltage value of the capacitor with respect to the voltage setpoint value (Vref).

3. The system for electrical regulation of a power transmission device as claimed in claim 2, wherein a sum $Ca.\omega a + Cb.\omega b$ remains continuously equal, or substantially equal, to the electrical setpoint value ($\Sigma$), Ca and Cb being values of torques respectively delivered by each of the two electrical machines, and $\omega a$ and $\omega b$ being values of respective rotation speeds of each of the two electrical machines.

4. The system for electrical regulation of a power transmission device as claimed in claim 1, wherein the system receives an input of a mechanical setpoint value (M) defined for the transmission.

5. The system for electrical regulation of a power transmission device as claimed in claim 4, wherein the electrical regulation is performed by resolving, either a system of two equations with two unknowns Ca and Cb, Ca and Cb being values of torques respectively delivered by each of the two electrical machines, when the electrical machines are not in torque limit, or a system comprising one equation and one inequality with two unknowns Ca and Cb, in other situations, so as to continuously ensure that a sum $Ca.\omega a + Cb.\omega b$ remains continuously equal, or substantially equal, to a given electrical setpoint value ($\Sigma$), and that a value of a controlled mechanical quantity is as close as possible to the mechanical setpoint value (M).

6. The system for electrical regulation of a power transmission device as claimed in claim 1, wherein the transfer of power between the two electrical machines is reversible.

7. The system for electrical regulation of a power transmission device as claimed in claim 2, wherein the system receives an input of a mechanical setpoint value (M) defined for the transmission.

8. The system for electrical regulation of a power transmission device as claimed in claim 3, wherein the system receives an input of a mechanical setpoint value (M) defined for the transmission.

9. The system for electrical regulation of a power transmission device as claimed in claim 2, wherein the transfer of power between the two electrical machines is reversible.

10. The system for electrical regulation of a power transmission device as claimed in claim 3, wherein the transfer of power between the two electrical machines is reversible.

11. The system for electrical regulation of a power transmission device as claimed in claim 4, wherein the transfer of power between the two electrical machines is reversible.

12. A system for the electrical regulation of a device for transmission of power between, on one side, a thermal engine and a pair of electrical machines equipping an automobile vehicle, and on the other side, drive wheels of the automobile vehicle,
    - the thermal engine being connected to the two electrical machines by means of a mechanical assembly,
    - an electrical connecting device being located between the two electrical machines so as to provide a direct passage for power from any one of the two electrical machines to the other of the two electrical machines, without a significant intermediate energy storage or recovery element,
    - the connecting device being controlled so that the power generated by any one of the two electrical machines is immediately consumed by the other of the two electrical machines, and so that the two electrical machines respond to requirements of a drive train,
    - the connecting device providing a transfer of electrical power between the two electrical machines by means of two inverters, each one of these inverters being associated with one electrical machine, these two inverters being connected to a bus having two lines connected via a capacitor,
    - wherein the connecting device ensures that a voltage (V) across terminals of the capacitor is continuously maintained at or around a given voltage setpoint value (Vref),
    - wherein the connecting device acts on the torques of both of the two electrical machines, either separately or simultaneously, and in any case continuously, in response to an error signal resulting from a comparison of a measured value of the voltage (V) with respect to the voltage setpoint value (Vref), wherein an electrical setpoint value ($\Sigma$) is produced by a corrector device from the error in the voltage value of the capacitor with respect to the voltage setpoint value (Vref), and wherein a sum $Ca.\omega a + Cb.\omega b$ remains continuously equal, or substantially equal, to the electrical setpoint value ($\Sigma$), Ca and Cb being values of torques respectively delivered by each of the two electrical machines, and wa and wb being values of respective rotation speeds of each of the two electrical machines.

13. The system for electrical regulation of a power transmission device as claimed in claim 12, wherein the system receives an input of a mechanical setpoint value (M) defined for the transmission.

14. The system for electrical regulation of a power transmission device as claimed in claim 13, wherein the electrical regulation is performed by resolving, either a system of two equations with two unknowns Ca and Cb, Ca and Cb being values of torques respectively delivered by each of the two electrical machines, when the electrical machines are not in torque limit, or a system comprising one equation and one inequality with two unknowns Ca and Cb, in other situations, so as to continuously ensure that a sum $Ca.\omega a + Cb.\omega b$ remains continuously equal, or substantially equal, to a given electrical setpoint value ($\Sigma$), and that a value of a controlled mechanical quantity is as close as possible to the mechanical setpoint value (M).

15. The system for electrical regulation of a power transmission device as claimed in claim 12, wherein the transfer of power between the two electrical machines is reversible.

16. The system for electrical regulation of a power transmission device as claimed in claim 13, wherein the transfer of power between the two electrical machines is reversible.

17. The system for electrical regulation of a power transmission device as claimed in claim 14, wherein the transfer of power between the two electrical machines is reversible.

* * * * *